Sept. 1, 1964  R. J. LOYD  3,146,616
THERMAL CHROMATOGRAPHY TEMPERATURE GRADIENT
Filed Nov. 24, 1958
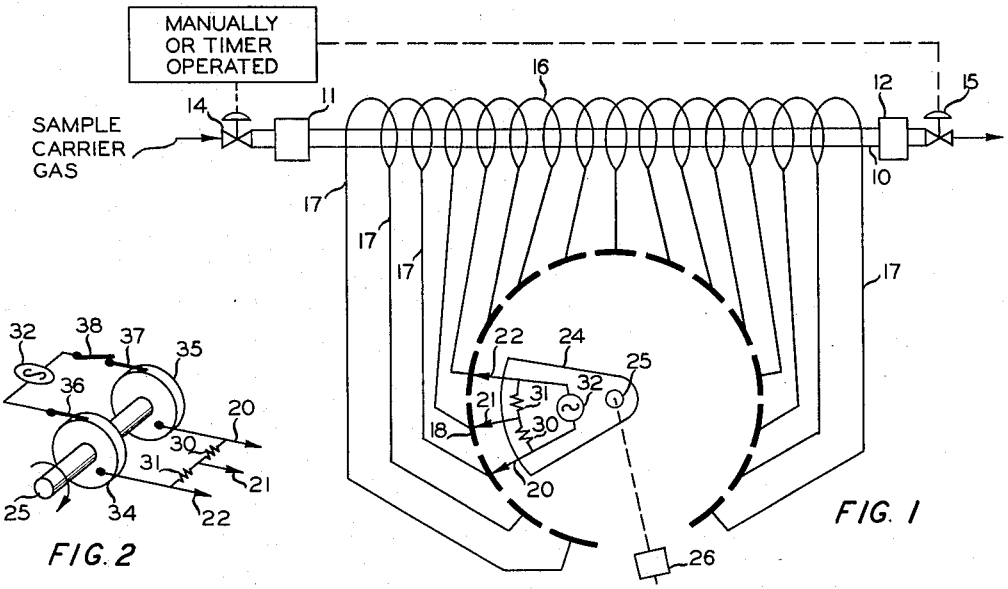
FIG. 1
FIG. 2
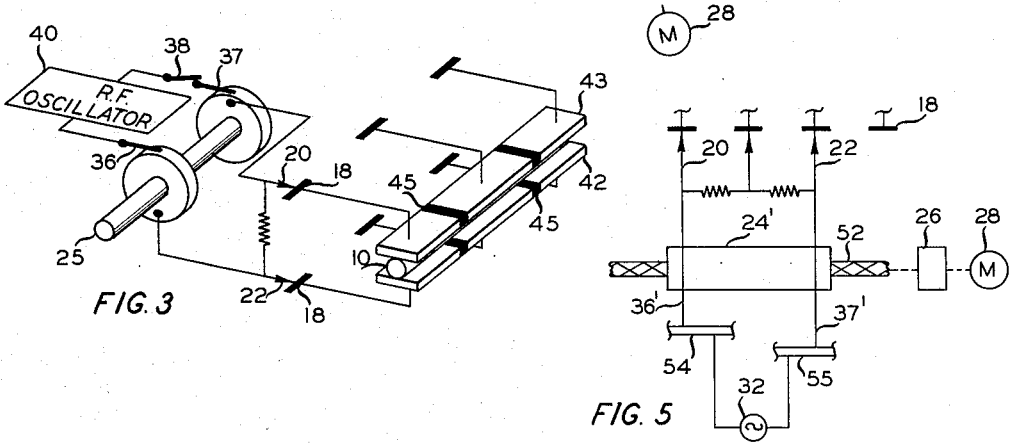
FIG. 3
FIG. 5
INDUCTION COILS MAY BE USED ALONE, MAY HEAT RESISTANCE COILS AND/OR MAY HEAT COLUMN AHEAD, BEHIND, OR AT SAME PORTION BY ARRANGING CONTACTS.
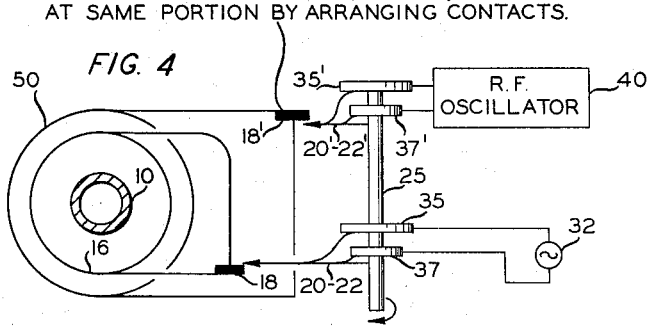
FIG. 4
INVENTOR.
R. J. LOYD
BY Hudson & Young
ATTORNEYS

United States Patent Office 3,146,616
Patented Sept. 1, 1964

3,146,616
THERMAL CHROMATOGRAPHY TEMPERATURE GRADIENT
Robert J. Loyd, Bartlesville, Okla., assignor to Phillips Petroleum Company, a corporation of Delaware
Filed Nov. 24, 1958, Ser. No. 775,919
10 Claims. (Cl. 73—23.1)

This invention relates to method and apparatus for producing and moving a temperature gradient along a chromatographic column. Specifically, it relates to method and apparatus for producing and moving such temperature gradient without having to move a furnace along the column.

It is known to separate fluid mixtures by introducing them into a packed column where they are sorbed on the packing. Separation is then carried out by moving a temperature gradient along the column and causing the respective fluids to selectively desorb from the packing. As a general rule, the prior art teaches the movement of a furnace along the column in order to achieve this. Such an approach as has been used involves a rather complex apparatus for moving the furnace along the column at a preselected rate and in maintaining an appropriate temperature gradient within that portion of the column that is subjected to heating by the furnace. Also, the prior art has generally taught that the ideal gradient is a perfectly linear gradient, but recent developments show that a "stairstep" temperature gradient permits of more readily controllable and more satisfactory separation.

As used herein, the word "sorbed" denotes the occurrence of a surface reaction, as by analogy to "sorption" defined in Hackh, Chemical Dictionary, 3rd ed., page 790.

The instant invention provides means for moving a temperature gradient along the column without having to move the furnace therealong. The advantages incorporated in the instant method and apparatus are the elimination of a complex mechanism for supporting and moving a furnace along a chromatographic column. Problems that relate to reversing means or other such mechanisms to return the furnace from the exit end of the column to the inlet end, in order to repeat an operation, are eliminated. The "stairstep" temperature gradient of the instant invention has the effect of compressing desorbed constituents of samples within a shorter distance along the column, as determined by differential temperature of the step.

In one embodiment this invention contemplates wrapping a column with a resistance coil and then providing taps from different portions of the coil. Electricity is supplied to respective ones of these taps in succession to thereby heat the portions of the coil connected between the taps. Another embodiment provides for employing an induction heating coil and an oscillator in order to move the temperature gradient along the column in much the same manner. Still a third embodiment involves providing a series of adjacently disposed capacitors to which radio frequency oscillations are applied in order to heat the column and/or the contents thereof.

By reason of the fact that the furnace or the heating means is fixedly disposed with respect to the column, the instant invention renders it possible to apply heat in a predetermined manner to columns of irregular configuration, i.e. helical, U-shaped, and other shapes which may be necessitated by the space limitations of chromatographic analyzers that are employed in plants for measuring and controlling their processes. This advantage is made possible by the fact that the taps can be connected to contacts which in turn can be arranged in a preselected geometric pattern and the taps connected to them. Such patterns would include circular and linear arrangements. This, then, renders it possible to employ a relatively simple mechanism to supply electrical power to the respective taps.

Accordingly, it is an object of this invention to provide an improved method and apparatus to move a temperature gradient along a column. It is still another object of this invention to provide an improved, simplified means to move the temperature gradient along a chromatographic column. It is still another of this invention to provide method and apparatus suitable for application of thermal chromatography techniques to columns of irregular shapes.

In the drawings: FIGURE 1 represents schematically one embodiment of the invention. FIGURE 2 shows the detail of the apparatus of FIGURE 1; FIGURES 3, 4 and 5 show various modifications and applications of the instant invention as represented in FIGURE 1. In the drawings, like numerals refer to like elements.

In FIGURE 1 is shown a chromatographic column 10 having at one end thereof a reference cell 11 and at the exit end thereof a sample cell 12. These two cells each contain a measuring element such as thermistors or bolometers which in turn comprise, respectively, branches of a Wheatstone bridge. The application of such elements as sample cells 11 and 12 with the Wheatstone bridge is well known in the art and need not be further described. The column also has associated therewith various valves such as 14 for admitting sample fluid, carrier gas, or a mixture of both, as the case may be. Additionally, a vent valve 15 may be provided if desired. Such valves are likewise well known in the art and may be either manually or timer operated.

Surrounding the column and disposed along its active length is a resistance heating coil 16. By "active length," I mean that length of the column wherein selective desorption, i.e. elution, transpires. The coil has a plurality of taps 17 connected to predetermined points therealong. It is preferred that the taps be equally spaced along coil 16 in order that equal heating effect can be generated between each two taps. Each tap is connected to a contact 18. These contacts are fixedly disposed in a predetermined geometrical arrangement such as the circular form shown in FIGURE 1, or the linear form as shown in FIGURE 5. In addition, the contacts are elongated so that a moving member, hereinafter described, can apply electrical power thereto for a predetermined period of time.

Means for applying electrical power to the coil via the taps comprise a means for engaging the contacts and a means for moving the engaging means past the contacts, such as a group of moving contactors 20, 21 and 22 which are arranged on support member 24 for movement in unison past the fixed contacts 18 so that the former can engage successively disposed groups of the contacts 18. The support member is in turn mounted on a shaft 25. The shaft delivers rotary motion to the support member, thence to the means for engaging (the moving members). Such motion is derived from a gear box 26 which is in turn driven by an electric motor such as 28.

It is to be noted that the three contactors 20, 21 and 22 are separated by resistors 30 and 31, thus forming a voltage divider. Three contactors are shown, but two or more can be employed. Electrical power is applied to the end contactors 20 and 22 from a source such as the alternating current generator 32.

FIGURE 2 shows a detail of the manner in which power is delivered from 32 to the contactors. Commutator elements 34 and 35 are fixedly mounted on the shaft 25 and also are connected to the power source 32 by means of their respective brushes 36 and 37. If desired, a switch 38 can be supplied to manually turn the heating power on and off. The brushes can be spring-biased against their respective commutators.

The foregoing assumes that an electrical resistance heater is used for the element 16. In order to achieve faster heating it may be desired that induction, or dielectric, heating be employed instead of or in addition to, the resistance heating. To this end FIGURE 3 shows a radio frequency oscillator 40 supplied as a power source. This oscillator should be a power type of radio frequency oscillator, for example an ultra-high frequency type such as described on pages 407 and 408 of "Radar Electronic Fundamentals," NAVSHIPS 900,016, U.S. Government Printing Office, dated June 1944 (not classified). This oscillator is tunable, capable of producing large power outputs at high frequencies, and is susceptible to increases in output upon the addition of a cooling system therefore. The column 10 is shown in FIGURE 3 as disposed between a plurality of capacitors 42, 43. Each pair of capacitor terminals 42, 43 is separated from the adjoining pair by insulation 45. Alternatively, a non-tunable oscillator of lower frequency and power may be used for dielectric heating. Such oscillators are described in "IRE Transactions on Industrial Electronics," PGIE-2, March 1955, pp. 61-68.

In certain chromatographic separations it may be found that a resistance heater 16 is too slow and that for some reason it is not desirable to use the capacitors 42, 43. In such case an induction coil can be substituted for the resistance heater 16 of FIG. 1. It may also be desired to employ both induction and resistance heaters in the manner shown in FIGURE 4. In the latter arrangement the brush and commutator elements are substantially as shown in FIGURE 2, and the coils surround the column. As indicated by the legend on the drawing, the induction coils 50 may cooperate with the resistance heater 16 in a variety of ways, according to the dictates of the process. Heating ahead, at the same time, or behind the heater 16 is accomplished by staggering the contacts in each bank relative to each other, by adjusting the position on the shaft 25 of the contactors for each bank, or by a combination of both of these techniques. FIGURE 4 shows two banks of contacts 18 and 18'. As a necessity, the means for engaging these contacts likewise are arranged in banks such as 20-22 and 20'-22'. Both such banks of contactors (means for engaging) can be driven from the same shaft by the motor 28.

The advantage in using the dielectric heating of FIGURE 3, as contrasted to the induction heating of FIGURE 4, is that the former enables heating to be applied directly to the column packing material which is usually an insulating material such as crushed fire brick, diatomaceous earth or the like. This permits somewhat quicker heating and does apply the heat at the point where it is desired to apply it for the purpose of eluting the materials in the column. On the other hand, the induction heating has its advantages in that uniform heating can be applied to all portions of the cross section of the column and that it is structurally more adaptable to use in conjunction with columns of various shapes and cross-sections, and with resistance heating. For example, the induction heating can be used to preheat the resistance coils and portions of the column so it won't take them so long to heat up.

FIGURE 5 shows an arrangement whereby a linear pattern of the fixed contacts 18 is provided. The support member is modified as shown in 24' for moving in a linear direction along a reversing helical screw 52. This screw is so arranged that when 24' reaches one end or the other of its path, that it will reverse and move in a direction such that it can return to its initial position. In order that electrical contact can always be provided, the power source 32 (or oscillator such as 40) is connected to a pair of bus bars 54 and 55 which are mounted and held parallel to the axis of the screw 52. Modified brushes 36' and 37' provide moving electrical contact between the bus bars and the contactors 20, 22.

The column and packing are preferably both of materials having a high dielectric constant, such as glass and diatomaceous earth, respectively, when dielectric heating is contemplated. Similarly, the column should be of a magnetic material such as iron, steel, or nickel, when induction heating is to be used. In the latter case it may also be desirable to mix a small amount of iron or nickel filings into the column packing to enhance both the inductive effect and the conduction of heat through the packing.

It should be apparent that I have provided an improved thermochromatographic apparatus whereby a temperature gradient can be moved longitudinally up a column without having to move a furnace therealong. As mentioned in the introductory portion, this offers advantages where the column is of irregular geometric shape because the taps can be brought out and placed in a regular geometric pattern whereby it is easy to apply power for heating to them. Although the drawings are schematic in nature it is to be noted that this invention contemplates appropriate means for supporting the coil with respect to the column, mounting various banks of contacts and contactors with respect to each other, and apparatus normally associated with the column such as a Wheatstone bridge, timing switches for manipulating valves, and the like. It should be also noted that the contacts 18 as shown in the various figures can be spaced preselected amounts so that contact will not occur at certain times. It should be also noted that the moving contacts, i.e. the means for engaging, 20, 21 and 22 can be spaced various amounts and are not limited to contacting immediately adjacent contacts 18. The resistors 30 and 31, it should be evident, can be relatively proportioned and may even comprise adjustable resistors inasmuch as their function is substantially that of a voltage divider. Banks of contactors and a plurality of heaters may be employed to provide a large number of finite temperature steps, thereby to approach a linear temperature gradient.

In the following claims when I refer to a "means for moving" and engaging or the like, I refer to apparatus such as the motor 28, gear transmission 26, the support 24 or 24'; and other such means or their equivalent for moving the contactors such as 20-22 in a predetermined path. Also, when I refer to "groups" of contacts, I refer to those contacts 18 which are simultaneously in electrical engagement with the moving contactors 20-22 and I do not intend to limit myself to only adjacent contacts being in such engagement. Moreover, when I refer to "successively disposed groups" I refer to those groups with contacts which come simultaneously into electrical engagement wtih contactors 20-22 as the latter move through their predetermined path.

It is not my intention or purpose to be limited to the specific embodiments claimed or disclosed but to include as my invention all those equivalents thereof which should be combined and directed toward the movement of a temperature gradient along a thermal chromatographic column without moving a furnace therealong.

I claim:
1. An improved thermochromatographic apparatus comprising a thermochromatographic column; sorption means within said column first and second coils fixedly disposed with respect to and surrounding said column, and one of said coils surrounding the other said coil; a plurality of taps, each one connected at one end to a predetermined point along one of said coils; first and second banks of contacts, each bank comprising a plurality of fixed contacts, each such contact being connected to one of said taps on one of said coils; at least two moving contactors for each said bank, the contactors being spaced one from the other to engage a predetermined group of said contacts in its respective bank; and means for moving the respective contactors along the contacts in their respective banks thereby to sequentially engage, in succession, a plurality of groups in each bank, whereby portions of said column are heated in regular sequence by each of said coils.

2. The apparatus of claim 1 wherein one of said coils is an induction heating coil.

3. The apparatus of claim 1 wherein one of said coils is a resistance heater.

4. The apparatus of claim 1 wherein said means for moving moves the contactors for each bank in unison.

5. The apparatus of claim 1 wherein said means for moving moves the contactors for both banks in unison.

6. In a method for operating a thermochromatographic apparatus wherein a fluid mixture is introduced into a sorbent packed column, the said mixture is sorbed onto the said packing and separation of the said mixture is carried out by moving a temperature gradient along the column to cause selective desorption from said packing, the improvement in moving the said temperature gradient along the said column comprising the steps of (a) creating the said temperature gradient by applying electrical power to at least a pair of a succession of points on an electrical impedance element in heat exchange relationship with said column;

(b) compressing desorbed constituents ahead of the said temperature gradient into a progressively shorter length of said column and (c) moving said temperature gradient in stairstep fashion along said column by applying electrical power to additional points of the said succession of points to continue the compressing of step "b" whereby the said selective desorption will be completed.

7. In a thermochromatographic apparatus having a thermochromatographic column; sorption means within said column; conduit means for passing a sample to be analyzed to said column; a reference cell at the entrance end to said column; a sample cell at the exit end of said column and heating means for said column; the improvement characterized in that the said heating means comprises, (a) an electrically conductive coil fixedly surrounding the active length of said column, said coil having a plurality of taps disposed lengthwise of said coil (b) a contact connected to each of said taps (c) means for engaging a group of at least two of said contacts and for connecting the same to a means for supplying electric power (d) a means for supplying electric power and (e) means for moving said means for engaging into sequential engagement with successively disposed groups of at least two of said contacts, whereby portions of said column are heated in regular sequence.

8. The apparatus of claim 7 wherein the said electrically conductive coil is a resistance coil.

9. The apparatus of claim 7 wherein the said electrically conductive coil is an inductance coil.

10. In a thermochromatographic apparatus having a thermochromatographic column; sorption means within said column; conduit means for passing a sample to be analyzed to said column; a reference cell at the entrance end to said column; a sample cell at the exit end of said column and heating means for said column; the improvement characterized in that the said heating means comprises, (a) dielectric heating means comprising a plurality of capacitors in heat exchange relationship with the active length of said column, each capacitor being provided with a pair of taps (b) a contact connected to each of said taps (c) means for engaging a group of at least two pairs of said contacts and for connecting same to a means for supplying electric power at radio frequency (d) a means for supplying electric power at radio frequency and (e) means for moving said means for engaging into sequential engagement with successively disposed groups of at least two pairs of said contacts, whereby portions of said column are heated in regular sequence.

References Cited in the file of this patent

UNITED STATES PATENTS

| | | |
|---|---|---|
| 1,669,582 | Staege | May 15, 1928 |
| 1,946,876 | Northrup | Feb. 13, 1934 |
| 2,398,817 | Turner | Apr. 23, 1946 |
| 2,415,025 | Grell et al. | Jan. 28, 1947 |
| 2,598,036 | Cahill et al. | May 27, 1952 |
| 2,719,799 | Christian | Oct. 4, 1955 |
| 2,764,253 | Weber | Sept. 25, 1956 |